(12) United States Patent
Jang

(10) Patent No.: US 6,179,236 B1
(45) Date of Patent: Jan. 30, 2001

(54) DEVICE FOR DRIVING A SPINNING REEL FOR FISHING

(76) Inventor: Deok-soo Jang, 684-24, Jurea-dong, Sasang-gu, Pusan (KR)

( * ) Notice: Under 35 U.S.C. 154(b), the term of this patent shall be extended for 0 days.

(21) Appl. No.: 09/506,922

(22) Filed: Feb. 18, 2000

(51) Int. Cl.$^7$ .................................................. A01K 89/015
(52) U.S. Cl. .......................................... 242/273; 242/322
(58) Field of Search .................................. 242/249, 273, 242/277, 278, 279, 263, 322

(56) References Cited

U.S. PATENT DOCUMENTS

| | | | |
|---|---|---|---|
| 4,418,877 | * | 12/1983 | Nakajima ............................... 242/322 |
| 4,427,162 | * | 1/1984 | Noda ..................................... 242/249 |
| 5,232,181 | * | 8/1993 | Fujine ................................... 242/279 |
| 5,934,589 | * | 8/1999 | Young ................................... 242/249 |

* cited by examiner

*Primary Examiner*—Donald P. Walsh
*Assistant Examiner*—Emmanuel M. Marcelo
(74) *Attorney, Agent, or Firm*—Jacobson, Price, Holman & Stern, PLLC

(57) ABSTRACT

A device for driving a spinning reel is to rotate a rotor shaft and a spool shaft in the opposite direction to each other while reciprocating the spool shaft back and forth. A first spiral gear of a rotor shaft and a second spiral gear for rotating a spool shaft in the opposite direction of rotation of the rotor shaft are respectively engaged to a drive gear in the opposite direction to each other to thereby rotate the rotor shaft and the spool shaft in the opposite direction to each other. The spool shaft has a cross-shaped spiral groove thereon and a guide pin for reciprocating the spool shaft back and forth is engaged with the spiral groove. Therefore when the drive gear is rotated, a rotor and a spool is rotated in the opposite direction to each other, and at the same time, the spool fixed to the spool shaft is reciprocated back and forth.

1 Claim, 4 Drawing Sheets

DEVICE FOR DRIVING A SPINNING REEL FOR FISHING

BACKGROUND OF THE INVENTION

1. Field of the Invention

The present invention relates to a spinning reel for fishing, and more particularly to a device for driving a spinning reel for fishing, which rotates a rotor shaft and a spool shaft in the opposite direction to each other through rotation of a drive gear, and at that time, reciprocates the spool shaft back and forth, thereby winding a fishing line very fast.

2. Description of the Related Art

In general, a conventional spinning reel for fishing is operated as follows. A drive gear of a handle shaft is in engagement with a spiral gear of a rotor shaft, and thereby a rotor, which is fixed integrally with the rotor shaft, is rotated by a rotation of the drive gear. A spool shaft, which passes through the rotor shaft, is reciprocated back and forth with the rotation of the rotor by operation of a cam or a gear, which is engaged to the drive gear, so that a fishing line is evenly wound on the spool.

However, since the conventional spinning reel wind s the fishing line only by the rotation of the rotor, on which a bail arm is disposed, while the spool is reciprocated back and forth, the winding speed of the fishing line is not fast and the number of rotations of handle is increased. Additionally, a back and forth motion device such as the gear or the cam must be installed in the spinning reel to rotate the spool shaft, thereby the reel has an increased size, a complicated construction and an increased weight.

SUMMARY OF THE INVENTION

It is an object of the present invention to provide a device for driving a spinning reel for fishing, which overcomes the disadvantages of the prior arts.

It is another object of the present invention to provide a device for driving a spinning reel for fishing, which reciprocates a spool back and forth while rotating a rotor and the spool in the opposite direction to each other.

To accomplish the above objects, the present invention provides a device for driving a spinning reel, wherein a first spiral gear of a rotor shaft and a second spiral gear for rotating a spool shaft in the opposite direction of rotation of the rotor shaft are respectively engaged to right and left sides of a drive gear in the opposite direction to each other to thereby rotate the rotor shaft and the spool shaft in the opposite direction to each other, and the spool shaft has a cross-shaped spiral groove thereon and a guide pin for reciprocating the spool shaft back and forth is engaged with the spiral groove. Therefore when the drive gear is rotated, a rotor and a spool is rotated in the opposite direction to each other, and at the same time, the spool fixed to the spool shaft is reciprocated back and forth.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE INVENTION

Figure 1:
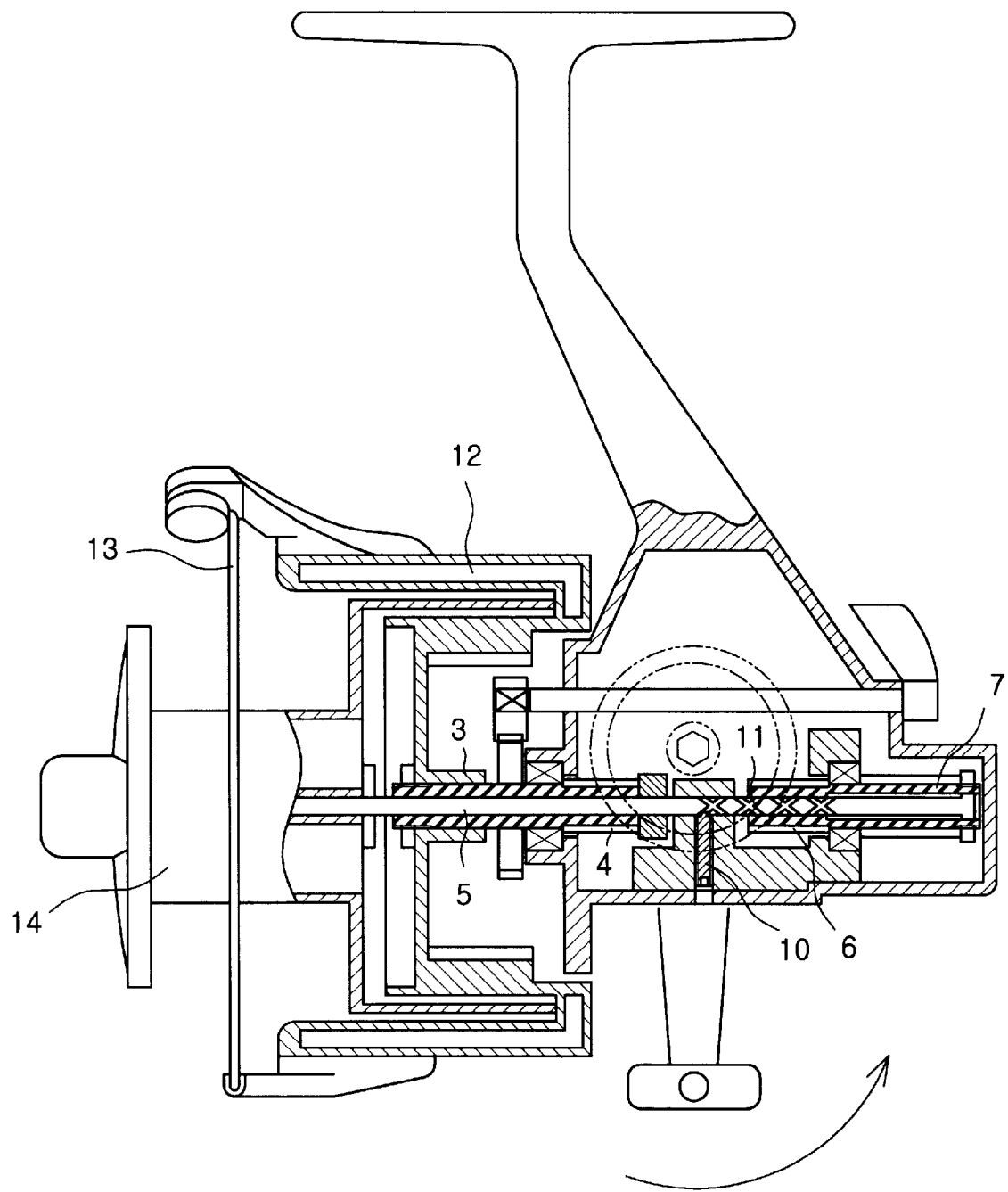
FIG. 1 is a sectional view of the present invention.
Figure 2:
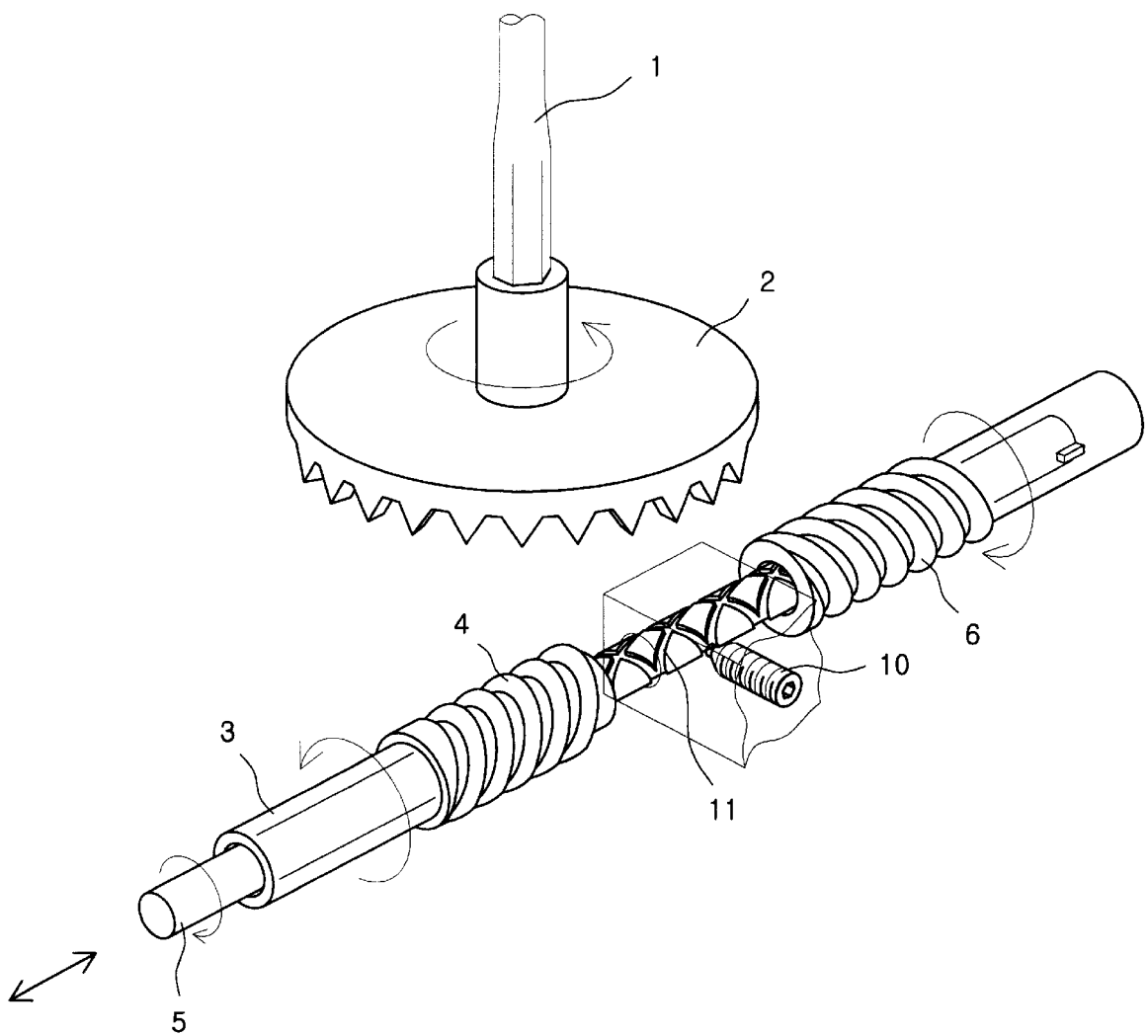
FIG. 2 is an expanded perspective view of the present invention.

The present invention will be described in detail hereinafter with reference to the accompanying drawings, wherein the same reference characters designate corresponding parts throughout several views. It is to be understood that these drawings depict only typical embodiments of the invention and are, therefore, not to be considered limiting of its scope.

A first spiral gear 4 of a rotor shaft 3 is in engagement with a drive gear 2 of a handle shaft 1. A spool shaft 5 is inserted into the inside of the rotor shaft 3 and into the inside of a rotary tube 7 in such a manner that the spool shaft can be reciprocated back and forth. The rotary tube 7 which has a second spiral gear 6 thereon is arranged at a certain interval from the rotor shaft 3. The spiral gears 4 and 6 are simultaneously engaged to right and left sides of the drive gear 2 in the opposite direction to each other. The spool shaft 5 has a key 8 formed on the end portion thereof, which is inserted into the rotary tube 7, and the rotary tube 7 has a key hole 9 formed therein. The key 8 of the spool shaft 5 is inserted into the key hole 9 of the rotary tube 7, so that the spool shaft 5 moves back and forth along the key hole 9. The spool shaft 5 has a cross-shaped spiral groove 11 formed on the center portion thereof. A guide pin 10 for leading the back and forth movement of the spool shaft 5 is in engagement with the cross-shaped spiral groove 11 and fixed at a reel body. Therefore, when the drive gear 2 rotates, the rotor shaft 3 and the spool shaft 5 are rotated in the opposite direction to each other, and at that time, the spool shaft 5 is reciprocated back and forth.

In the drawings, the reference 12 indicates a rotor on which a bail arm 13 is disposed and the reference 14 indicates a spool.

The spinning reel with the above structure functions as follows.

Because the first spiral gear 4 of the rotor shaft 3 and the second spiral gear 6 of the rotary tube 7 are in engagement with the drive gear 2 in the opposite direction, when the drive gear 2 is rotated by the rotation of the handle shaft 1, the rotor shaft 3 and the rotary tube 7 are rotated in the opposite direction to each other through the direction of the spiral gears 4 and 6 engaged to the drive gear 2. Therefore, when a fishing line is wound by the rotor 12 and the bail arm 13, the spool 14 is rotated in the opposite direction to the rotation of the rotor 12, so that the fishing line is wound twice as fast as that of the conventional spinning reel.

Figure 3:
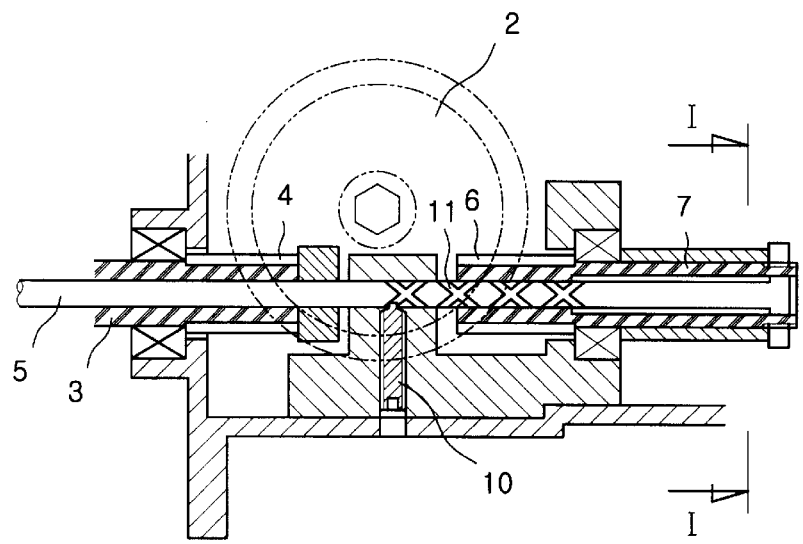
FIG. 3 is a sectional view illustrating a state of a backward movement of a spool shaft.
Figure 4:
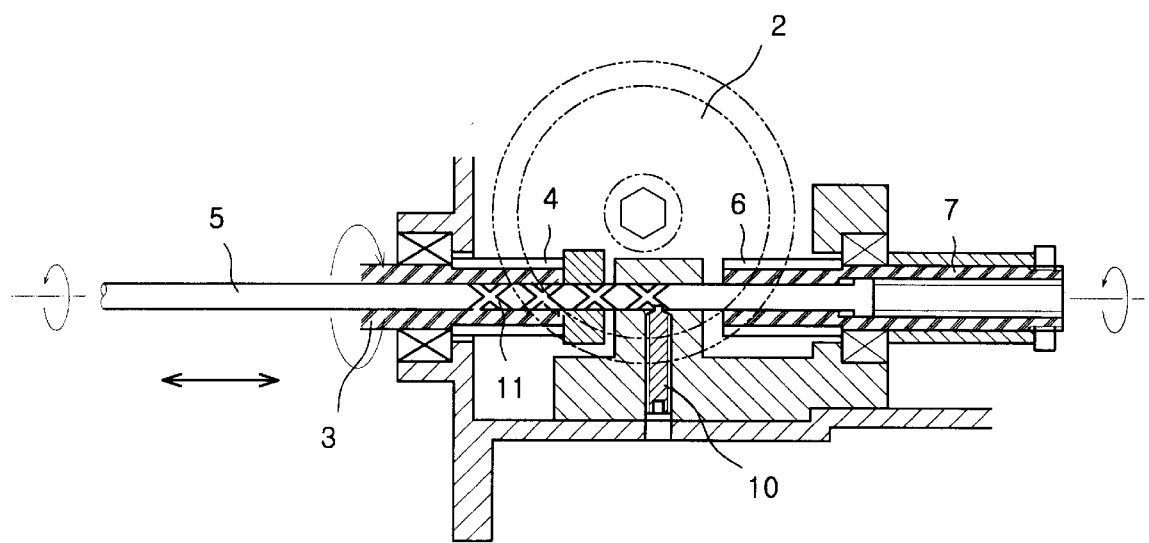
FIG. 4 is a sectional view illustrating a state of a forward movement of the spool shaft.
Figure 5:
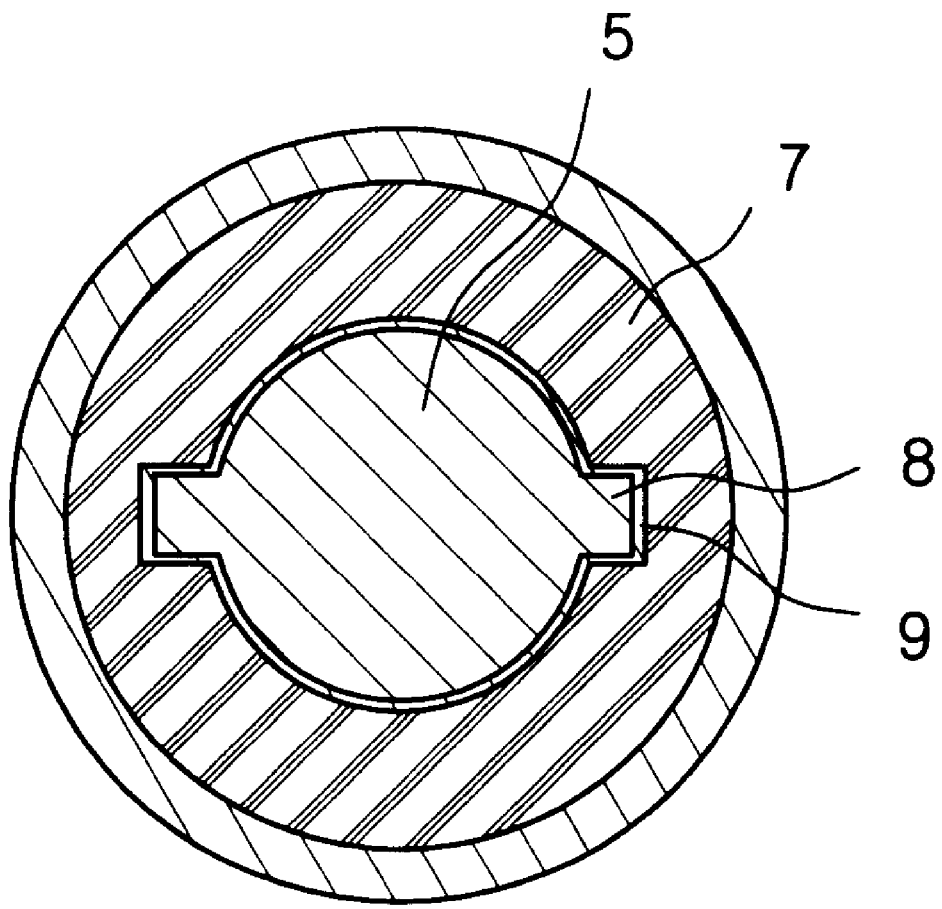
FIG. 5 is a sectional view along a line I—I of FIG. 3.

Because the key 8 of the spool shaft 5 is inserted into the key hole 9 of the rotary tube 7, the spool shaft 5 moves back and forth along the key hole 9 inside the rotary tube 7, and at the same time, rotates with the rotary tube 7 during the rotation of the rotary tube 7. When the spool shaft 5 is rotated by the rotation of the rotary tube 7, the spool shaft 5 is reciprocated back and forth by the guide pin 10 which is in engagement with the spiral groove 11 of the spool shaft 5. Therefore, the spool 14 fixed to the spool shaft 5 is rotated and reciprocated back and forth, so that the fishing line is evenly wound on the spool 14 (see FIGS. 3 and 4).

As previously described above, when the drive gear 2 is rotated, the rotor 12 and the spool 14 are rotated in the opposite direction to each other, and at the same time, the spool 14 is reciprocated back and forth, so that the winding speed of the fishing line is more than twice as fast as that of the conventional spinning reel and a winding period of time is reduced to reduce a user's fatigue. Furthermore, the spinning reel has a simple construction and a reduced production cost.

Those skilled in the art will readily recognize that these and various other modifications and changes may be made to the present invention without strictly following the exemplary application illustrated and described herein, and without departing from the true spirit and scope of the present invention, which is set forth in the following claims.

What is claimed is:

1. A device for driving a spinning reel for fishing in which a first spiral gear of a rotor shaft is in engagement with a drive gear of a handle shaft and a spool shaft is inserted into the inside of the rotor shaft in such a manner that the spool shaft can be reciprocated back and forth, wherein the spool shaft is inserted also into the inside of a rotary tube, which has a second spiral gear thereon and is arranged at a certain interval from the rotor shaft, wherein the spiral gears are simultaneously engaged to the drive gear in the opposite direction to each other, wherein the spool shaft has a key formed on the end portion thereof, and the rotary tube has a key hole formed therein to insert the key of the spool shaft into the key hole of the rotary tube, so that the spool shaft moves back and forth along the key hole, wherein the spool shaft has a cross-shaped spiral groove formed on the center portion thereof and a guide pin for leading the back and forth movement of the spool shaft is in engagement with the cross-shaped spiral groove and fixed at a reel body, thereby rotating the rotor shaft and the spool shaft in the opposite direction to each other while reciprocating the spool shaft back and forth when the drive gear rotates.

* * * * *